US009584403B2

(12) United States Patent
Hughes et al.

(10) Patent No.: US 9,584,403 B2
(45) Date of Patent: Feb. 28, 2017

(54) COMMUNICATIONS SCHEDULER

(71) Applicant: Silver Peak Systems, Inc., Santa Clara, CA (US)

(72) Inventors: David Anthony Hughes, Los Altos Hills, CA (US); Balaji Balasubramanian, San Jose, CA (US); Danny Kwok, Los Altos, CA (US)

(73) Assignee: Silver Peak Systems, Inc., Santa Clara, CA (US)

( * ) Notice: Subject to any disclaimer, the term of this patent is extended or adjusted under 35 U.S.C. 154(b) by 0 days.

(21) Appl. No.: 14/477,804

(22) Filed: Sep. 4, 2014

(65) Prior Publication Data
US 2014/0379937 A1 Dec. 25, 2014

Related U.S. Application Data

(63) Continuation of application No. 11/498,491, filed on Aug. 2, 2006, now Pat. No. 8,885,632.

(51) Int. Cl.
*H04L 12/28* (2006.01)
*H04L 12/865* (2013.01)
(Continued)

(52) U.S. Cl.
CPC ........... *H04L 45/24* (2013.01); *H04L 43/0894* (2013.01); *H04L 45/00* (2013.01); *H04L 47/22* (2013.01); *H04L 47/24* (2013.01); *H04L 47/6275* (2013.01)

(58) Field of Classification Search
CPC ........... H04W 28/065; H04W 28/0289; H04W 28/0247; H04W 28/10; H04W 28/0231; H04W 28/0268; H04W 48/06; H04L 45/00; H04L 45/24; H04L 47/22; H04L 47/24; H04L 47/6275; H04L 43/0894
(Continued)

(56) References Cited

U.S. PATENT DOCUMENTS 4,494,108 A   1/1985 Langdon, Jr. et al.
4,558,302 A   12/1985 Welch
(Continued)

FOREIGN PATENT DOCUMENTS

EP   1507353     2/2005
JP   H05-061964  3/1993
WO   WO0135226 A1  5/2001

OTHER PUBLICATIONS

"Business Wire, ""Silver Peak Systems Delivers Family of Appliances for Enterprise-Wide Centralization of Branch Office Infrastructure; Innovative Local Instance Networking Approach Overcomes Traditional Application Acceleration Pitfalls""(available at http://www.businesswire.com/news/home/20050919005450/en/Silver-Peak-Systems-Delivers-Family-Appliances-Enterprise-Wide#.UVzkPk7u-1 (last visited Aug. 8, 2014))."
(Continued)

*Primary Examiner* — Hoang-Chuong Vu
(74) *Attorney, Agent, or Firm* — Carr & Ferrell LLP

(57) ABSTRACT

A system for providing communications over a communications network includes a communications interface and a processor. The communications interface communicates over the communications network. The processor directs a communications scheduler to determine at least one metric for a path within the communications network. The processor also selects a data flow for the path and determines whether to transmit a packet in the selected data flow based on the at least one metric. The processor then directs a communications protocol handler to generate the packet for the selected data flow.

20 Claims, 8 Drawing Sheets

(51) Int. Cl.
*H04L 12/707* (2013.01)
*H04L 12/26* (2006.01)
*H04L 12/701* (2013.01)
*H04L 12/815* (2013.01)
*H04L 12/851* (2013.01)

(58) Field of Classification Search
USPC .............. 370/395.4, 351, 229–235, 238
See application file for complete search history.

(56) References Cited

U.S. PATENT DOCUMENTS

| | | | |
|---|---|---|---|
| 4,612,532 | A | 9/1986 | Bacon et al. |
| 5,023,611 | A | 6/1991 | Chamzas et al. |
| 5,243,341 | A | 9/1993 | Seroussi et al. |
| 5,307,413 | A | 4/1994 | Denzer |
| 5,357,250 | A | 10/1994 | Healey et al. |
| 5,359,720 | A | 10/1994 | Tamura et al. |
| 5,373,290 | A | 12/1994 | Lempel et al. |
| 5,483,556 | A | 1/1996 | Pillan et al. |
| 5,532,693 | A | 7/1996 | Winters et al. |
| 5,592,613 | A | 1/1997 | Miyazawa et al. |
| 5,611,049 | A | 3/1997 | Pitts |
| 5,627,533 | A | 5/1997 | Clark |
| 5,635,932 | A | 6/1997 | Shinagawa et al. |
| 5,652,581 | A | 7/1997 | Furlan et al. |
| 5,659,737 | A | 8/1997 | Matsuda |
| 5,675,587 | A | 10/1997 | Okuyama et al. |
| 5,710,562 | A | 1/1998 | Gormish et al. |
| 5,748,122 | A | 5/1998 | Shinagawa et al. |
| 5,754,774 | A | 5/1998 | Bittinger et al. |
| 5,802,106 | A | 9/1998 | Packer |
| 5,805,822 | A | 9/1998 | Long et al. |
| 5,883,891 | A | 3/1999 | Williams et al. |
| 5,903,230 | A | 5/1999 | Masenas |
| 5,955,976 | A | 9/1999 | Heath |
| 6,000,053 | A | 12/1999 | Levine et al. |
| 6,003,087 | A | 12/1999 | Housel, III et al. |
| 6,054,943 | A | 4/2000 | Lawrence |
| 6,081,883 | A | 6/2000 | Popelka et al. |
| 6,084,855 | A * | 7/2000 | Soirinsuo ............ H04L 29/06 370/235 |
| 6,175,944 | B1 | 1/2001 | Urbanke et al. |
| 6,191,710 | B1 | 2/2001 | Waletzki |
| 6,295,541 | B1 | 9/2001 | Bodnar et al. |
| 6,308,148 | B1 | 10/2001 | Bruins et al. |
| 6,311,260 | B1 | 10/2001 | Stone et al. |
| 6,339,616 | B1 | 1/2002 | Kovalev |
| 6,374,266 | B1 | 4/2002 | Shnelvar |
| 6,434,641 | B1 | 8/2002 | Haupt et al. |
| 6,434,662 | B1 | 8/2002 | Greene et al. |
| 6,438,664 | B1 | 8/2002 | McGrath et al. |
| 6,452,915 | B1 | 9/2002 | Jorgensen |
| 6,489,902 | B2 | 12/2002 | Heath |
| 6,493,698 | B1 | 12/2002 | Beylin |
| 6,570,511 | B1 | 5/2003 | Cooper |
| 6,587,985 | B1 | 7/2003 | Fukushima et al. |
| 6,614,368 | B1 | 9/2003 | Cooper |
| 6,618,397 | B1 | 9/2003 | Huang |
| 6,633,953 | B2 | 10/2003 | Stark |
| 6,643,259 | B1 | 11/2003 | Borella et al. |
| 6,650,644 | B1 | 11/2003 | Colley et al. |
| 6,653,954 | B2 | 11/2003 | Rijavec |
| 6,667,700 | B1 | 12/2003 | McCanne et al. |
| 6,674,769 | B1 | 1/2004 | Viswanath |
| 6,718,361 | B1 | 4/2004 | Basani et al. |
| 6,728,840 | B1 | 4/2004 | Shatil et al. |
| 6,738,379 | B1 | 5/2004 | Balazinski et al. |
| 6,769,048 | B2 | 7/2004 | Goldberg et al. |
| 6,791,945 | B1 | 9/2004 | Levenson et al. |
| 6,856,651 | B2 | 2/2005 | Singh |
| 6,859,842 | B1 | 2/2005 | Nakamichi et al. |
| 6,862,602 | B2 | 3/2005 | Guha |
| 6,910,106 | B2 | 6/2005 | Sechrest et al. |
| 6,963,980 | B1 | 11/2005 | Mattsson |
| 6,968,374 | B2 | 11/2005 | Lemieux et al. |
| 6,978,384 | B1 | 12/2005 | Milliken |
| 7,007,044 | B1 | 2/2006 | Rafert et al. |
| 7,020,750 | B2 | 3/2006 | Thiyagaranjan et al. |
| 7,035,214 | B1 | 4/2006 | Seddigh et al. |
| 7,047,281 | B1 | 5/2006 | Kausik |
| 7,069,268 | B1 | 6/2006 | Burns et al. |
| 7,069,342 | B1 | 6/2006 | Biederman |
| 7,110,407 | B1 | 9/2006 | Khanna |
| 7,111,005 | B1 | 9/2006 | Wessman |
| 7,113,962 | B1 | 9/2006 | Kee et al. |
| 7,120,666 | B2 | 10/2006 | McCanne et al. |
| 7,145,889 | B1 | 12/2006 | Zhang et al. |
| 7,197,597 | B1 | 3/2007 | Scheid et al. |
| 7,200,847 | B2 | 4/2007 | Straube et al. |
| 7,215,667 | B1 | 5/2007 | Davis |
| 7,242,681 | B1 | 7/2007 | Van Bokkelen et al. |
| 7,243,094 | B2 | 7/2007 | Tabellion et al. |
| 7,266,645 | B2 | 9/2007 | Garg et al. |
| 7,278,016 | B1 | 10/2007 | Detrick et al. |
| 7,318,100 | B2 | 1/2008 | Demmer et al. |
| 7,366,829 | B1 | 4/2008 | Luttrell et al. |
| 7,380,006 | B2 | 5/2008 | Srinivas et al. |
| 7,383,329 | B2 | 6/2008 | Erickson |
| 7,383,348 | B2 | 6/2008 | Seki et al. |
| 7,388,844 | B1 | 6/2008 | Brown et al. |
| 7,389,357 | B2 | 6/2008 | Duffie, III et al. |
| 7,389,393 | B1 | 6/2008 | Karr et al. |
| 7,417,570 | B2 | 8/2008 | Srinivasan et al. |
| 7,417,991 | B1 | 8/2008 | Crawford et al. |
| 7,420,992 | B1 | 9/2008 | Fang et al. |
| 7,428,573 | B2 | 9/2008 | McCanne et al. |
| 7,451,237 | B2 | 11/2008 | Takekawa et al. |
| 7,453,379 | B2 | 11/2008 | Plamondon |
| 7,454,443 | B2 | 11/2008 | Ram et al. |
| 7,457,315 | B1 | 11/2008 | Smith |
| 7,460,473 | B1 | 12/2008 | Kodama et al. |
| 7,471,629 | B2 | 12/2008 | Melpignano |
| 7,532,134 | B2 | 5/2009 | Samuels et al. |
| 7,555,484 | B2 | 6/2009 | Kulkarni et al. |
| 7,571,343 | B1 | 8/2009 | Xiang et al. |
| 7,571,344 | B2 | 8/2009 | Hughes et al. |
| 7,587,401 | B2 | 9/2009 | Yeo et al. |
| 7,596,802 | B2 | 9/2009 | Border et al. |
| 7,619,545 | B2 | 11/2009 | Samuels et al. |
| 7,620,870 | B2 | 11/2009 | Srinivasan et al. |
| 7,624,446 | B1 | 11/2009 | Wilhelm |
| 7,630,295 | B2 | 12/2009 | Hughes et al. |
| 7,639,700 | B1 | 12/2009 | Nabhan et al. |
| 7,643,426 | B1 | 1/2010 | Lee et al. |
| 7,644,230 | B1 | 1/2010 | Hughes et al. |
| 7,676,554 | B1 | 3/2010 | Malmskog et al. |
| 7,698,431 | B1 | 4/2010 | Hughes |
| 7,702,843 | B1 | 4/2010 | Chen et al. |
| 7,714,747 | B2 | 5/2010 | Fallon |
| 7,746,781 | B1 | 6/2010 | Xiang |
| 7,764,606 | B1 | 7/2010 | Ferguson et al. |
| 7,810,155 | B1 | 10/2010 | Ravi |
| 7,827,237 | B2 | 11/2010 | Plamondon |
| 7,849,134 | B2 | 12/2010 | McCanne et al. |
| 7,853,699 | B2 | 12/2010 | Wu et al. |
| 7,873,786 | B1 | 1/2011 | Singh et al. |
| 7,941,606 | B1 | 5/2011 | Pullela et al. |
| 7,945,736 | B2 | 5/2011 | Hughes et al. |
| 7,948,921 | B1 | 5/2011 | Hughes et al. |
| 7,953,869 | B2 | 5/2011 | Demmer et al. |
| 7,970,898 | B2 | 6/2011 | Clubb et al. |
| 8,069,225 | B2 | 11/2011 | Mccanne et al. |
| 8,072,985 | B2 | 12/2011 | Golan et al. |
| 8,090,027 | B2 | 1/2012 | Schneider |
| 8,095,774 | B1 | 1/2012 | Hughes et al. |
| 8,140,757 | B1 | 3/2012 | Singh et al. |
| 8,171,238 | B1 | 5/2012 | Hughes et al. |
| 8,209,334 | B1 | 6/2012 | Doerner |
| 8,225,072 | B2 | 7/2012 | Hughes et al. |
| 8,271,325 | B2 | 9/2012 | Silverman et al. |
| 8,307,115 | B1 | 11/2012 | Hughes |
| 8,312,226 | B2 | 11/2012 | Hughes |
| 8,352,608 | B1 | 1/2013 | Keagy et al. |

(56) References Cited

U.S. PATENT DOCUMENTS

| | | |
|---|---|---|
| 8,370,583 B2 | 2/2013 | Hughes |
| 8,386,797 B1 | 2/2013 | Danilak |
| 8,392,684 B2 | 3/2013 | Hughes |
| 8,442,052 B1 | 5/2013 | Hughes |
| 8,447,740 B1 | 5/2013 | Huang et al. |
| 8,473,714 B2 | 6/2013 | Hughes et al. |
| 8,489,562 B1 | 7/2013 | Hughes et al. |
| 8,516,158 B1 | 8/2013 | Wu et al. |
| 8,565,118 B2 | 10/2013 | Shukla et al. |
| 8,595,314 B1 | 11/2013 | Hughes |
| 8,613,071 B2 | 12/2013 | Day et al. |
| 8,681,614 B1 | 3/2014 | McCanne et al. |
| 8,700,771 B1 | 4/2014 | Ramankutty et al. |
| 8,706,947 B1 | 4/2014 | Vincent |
| 8,725,988 B2 | 5/2014 | Hughes et al. |
| 8,732,423 B1 | 5/2014 | Hughes |
| 8,738,865 B1 | 5/2014 | Hughes et al. |
| 8,743,683 B1 | 6/2014 | Hughes |
| 8,755,381 B2 | 6/2014 | Hughes et al. |
| 8,811,431 B2 | 8/2014 | Hughes |
| 8,885,632 B2 | 11/2014 | Hughes et al. |
| 8,929,380 B1 | 1/2015 | Hughes et al. |
| 8,929,402 B1 | 1/2015 | Hughes |
| 8,930,650 B1 | 1/2015 | Hughes et al. |
| 9,003,541 B1 | 4/2015 | Patidar |
| 9,036,662 B1 | 5/2015 | Hughes |
| 9,054,876 B1 | 6/2015 | Yagnik |
| 9,092,342 B2 | 7/2015 | Hughes et al. |
| 9,130,991 B2 | 9/2015 | Hughes |
| 9,143,455 B1 | 9/2015 | Hughes |
| 9,152,574 B2 | 10/2015 | Hughes et al. |
| 9,191,342 B2 | 11/2015 | Hughes et al. |
| 9,253,277 B2 | 2/2016 | Hughes et al. |
| 9,306,818 B2 | 4/2016 | Aumann et al. |
| 9,363,309 B2 | 6/2016 | Hughes |
| 9,397,951 B1 | 7/2016 | Hughes |
| 9,438,538 B2 | 9/2016 | Hughes et al. |
| 2001/0026231 A1 | 10/2001 | Satoh |
| 2001/0054084 A1 | 12/2001 | Kosmynin |
| 2002/0007413 A1 | 1/2002 | Garcia-Luna-Aceves et al. |
| 2002/0010702 A1 | 1/2002 | Ajtai et al. |
| 2002/0040475 A1 | 4/2002 | Yap et al. |
| 2002/0061027 A1 | 5/2002 | Abiru et al. |
| 2002/0065998 A1 | 5/2002 | Buckland |
| 2002/0071436 A1 | 6/2002 | Border et al. |
| 2002/0078242 A1 | 6/2002 | Viswanath |
| 2002/0101822 A1 | 8/2002 | Ayyagari et al. |
| 2002/0107988 A1 | 8/2002 | Jordan |
| 2002/0116424 A1 | 8/2002 | Radermacher et al. |
| 2002/0129158 A1* | 9/2002 | Zhang ............... H04L 47/10 709/234 |
| 2002/0129260 A1 | 9/2002 | Benfield et al. |
| 2002/0131434 A1 | 9/2002 | Vukovic et al. |
| 2002/0150041 A1 | 10/2002 | Reinshmidt et al. |
| 2002/0163911 A1 | 11/2002 | Wee et al. |
| 2002/0169818 A1 | 11/2002 | Stewart et al. |
| 2002/0181494 A1 | 12/2002 | Rhee |
| 2002/0188871 A1 | 12/2002 | Noehring et al. |
| 2002/0194324 A1 | 12/2002 | Guha |
| 2003/0002664 A1 | 1/2003 | Anand |
| 2003/0009558 A1 | 1/2003 | Ben-Yehezkel |
| 2003/0012400 A1 | 1/2003 | McAuliffe et al. |
| 2003/0046572 A1 | 3/2003 | Newman et al. |
| 2003/0123481 A1 | 7/2003 | Neale et al. |
| 2003/0123671 A1 | 7/2003 | He et al. |
| 2003/0131079 A1 | 7/2003 | Neale et al. |
| 2003/0133568 A1 | 7/2003 | Stein et al. |
| 2003/0142658 A1 | 7/2003 | Ofuji et al. |
| 2003/0149661 A1 | 8/2003 | Mitchell et al. |
| 2003/0149869 A1 | 8/2003 | Gleichauf |
| 2003/0204619 A1 | 10/2003 | Bays |
| 2003/0214502 A1 | 11/2003 | Park et al. |
| 2003/0214954 A1* | 11/2003 | Oldak et al. ............ 370/400 |
| 2003/0233431 A1 | 12/2003 | Reddy et al. |
| 2004/0008711 A1 | 1/2004 | Lahti et al. |
| 2004/0047308 A1 | 3/2004 | Kavanagh et al. |
| 2004/0083299 A1 | 4/2004 | Dietz et al. |
| 2004/0086114 A1 | 5/2004 | Rarick |
| 2004/0088376 A1 | 5/2004 | McCanne et al. |
| 2004/0114569 A1 | 6/2004 | Naden et al. |
| 2004/0117571 A1 | 6/2004 | Chang et al. |
| 2004/0123139 A1 | 6/2004 | Aiello et al. |
| 2004/0158644 A1* | 8/2004 | Albuquerque ........ H04L 41/08 709/238 |
| 2004/0179542 A1 | 9/2004 | Murakami et al. |
| 2004/0181679 A1 | 9/2004 | Dettinger et al. |
| 2004/0199771 A1 | 10/2004 | Morten et al. |
| 2004/0202110 A1 | 10/2004 | Kim |
| 2004/0203820 A1 | 10/2004 | Billhartz |
| 2004/0205332 A1 | 10/2004 | Bouchard et al. |
| 2004/0243571 A1 | 12/2004 | Judd |
| 2004/0250027 A1 | 12/2004 | Heflinger |
| 2004/0255048 A1 | 12/2004 | Lev Ran et al. |
| 2005/0010653 A1 | 1/2005 | McCanne |
| 2005/0044270 A1 | 2/2005 | Grove et al. |
| 2005/0053094 A1 | 3/2005 | Cain et al. |
| 2005/0055372 A1 | 3/2005 | Springer, Jr. et al. |
| 2005/0055399 A1* | 3/2005 | Savchuk ............. H04L 63/1416 709/203 |
| 2005/0071453 A1 | 3/2005 | Ellis et al. |
| 2005/0091234 A1 | 4/2005 | Hsu et al. |
| 2005/0111460 A1 | 5/2005 | Sahita |
| 2005/0131939 A1 | 6/2005 | Douglis et al. |
| 2005/0132252 A1 | 6/2005 | Fifer et al. |
| 2005/0141425 A1 | 6/2005 | Foulds |
| 2005/0171937 A1 | 8/2005 | Hughes et al. |
| 2005/0177603 A1 | 8/2005 | Shavit |
| 2005/0190694 A1 | 9/2005 | Ben-Nun et al. |
| 2005/0207443 A1 | 9/2005 | Kawamura et al. |
| 2005/0210151 A1 | 9/2005 | Abdo et al. |
| 2005/0220019 A1 | 10/2005 | Melpignano |
| 2005/0220097 A1* | 10/2005 | Swami ............... H04L 12/5693 370/389 |
| 2005/0235119 A1 | 10/2005 | Sechrest et al. |
| 2005/0240380 A1 | 10/2005 | Jones |
| 2005/0243743 A1 | 11/2005 | Kimura |
| 2005/0243835 A1* | 11/2005 | Sharma et al. ........ 370/395.42 |
| 2005/0256972 A1 | 11/2005 | Cochran et al. |
| 2005/0278459 A1 | 12/2005 | Boucher et al. |
| 2005/0283355 A1 | 12/2005 | Itani et al. |
| 2005/0286526 A1 | 12/2005 | Sood et al. |
| 2006/0013210 A1 | 1/2006 | Bordogna et al. |
| 2006/0026425 A1 | 2/2006 | Douceur et al. |
| 2006/0031936 A1 | 2/2006 | Nelson et al. |
| 2006/0036901 A1 | 2/2006 | Yang et al. |
| 2006/0039354 A1 | 2/2006 | Rao et al. |
| 2006/0045096 A1* | 3/2006 | Farmer ................ H04L 47/10 370/395.42 |
| 2006/0059171 A1 | 3/2006 | Borthakur et al. |
| 2006/0059173 A1 | 3/2006 | Hirsch et al. |
| 2006/0117385 A1 | 6/2006 | Mester et al. |
| 2006/0136913 A1 | 6/2006 | Sameske |
| 2006/0143497 A1 | 6/2006 | Zohar et al. |
| 2006/0195547 A1 | 8/2006 | Sundarrajan et al. |
| 2006/0195840 A1 | 8/2006 | Sundarrajan et al. |
| 2006/0212426 A1 | 9/2006 | Shakara et al. |
| 2006/0218390 A1 | 9/2006 | Loughran et al. |
| 2006/0227717 A1 | 10/2006 | van den Berg et al. |
| 2006/0250965 A1 | 11/2006 | Irwin |
| 2006/0268932 A1 | 11/2006 | Singh et al. |
| 2006/0280205 A1 | 12/2006 | Cho |
| 2007/0002804 A1 | 1/2007 | Xiong et al. |
| 2007/0008884 A1* | 1/2007 | Tang .................. H04L 29/06 370/230 |
| 2007/0011424 A1 | 1/2007 | Sharma et al. |
| 2007/0038815 A1 | 2/2007 | Hughes |
| 2007/0038816 A1 | 2/2007 | Hughes et al. |
| 2007/0038858 A1 | 2/2007 | Hughes |
| 2007/0050475 A1 | 3/2007 | Hughes |
| 2007/0076693 A1* | 4/2007 | Krishnaswamy ............ 370/352 |
| 2007/0081513 A1* | 4/2007 | Torsner ............. H04W 72/1242 370/349 |
| 2007/0097874 A1 | 5/2007 | Hughes et al. |
| 2007/0110046 A1* | 5/2007 | Farrell et al. ............. 370/389 |

(56) References Cited

U.S. PATENT DOCUMENTS

| | | |
|---|---|---|
| 2007/0115812 A1 | 5/2007 | Hughes |
| 2007/0127372 A1 | 6/2007 | Khan et al. |
| 2007/0130114 A1 | 6/2007 | Li et al. |
| 2007/0140129 A1 | 6/2007 | Bauer et al. |
| 2007/0150497 A1 | 6/2007 | De La Cruz et al. |
| 2007/0174428 A1 | 7/2007 | Lev Ran et al. |
| 2007/0179900 A1 | 8/2007 | Daase et al. |
| 2007/0195702 A1 | 8/2007 | Yuen et al. |
| 2007/0195789 A1* | 8/2007 | Yao ............... H04L 12/5693 370/395.21 |
| 2007/0198523 A1 | 8/2007 | Hayim |
| 2007/0226320 A1 | 9/2007 | Hager et al. |
| 2007/0237104 A1* | 10/2007 | Alon ............... H04W 52/0216 370/311 |
| 2007/0244987 A1 | 10/2007 | Pedersen et al. |
| 2007/0245079 A1 | 10/2007 | Bhattacharjee et al. |
| 2007/0248084 A1 | 10/2007 | Whitehead |
| 2007/0258468 A1 | 11/2007 | Bennett |
| 2007/0263554 A1 | 11/2007 | Finn |
| 2007/0276983 A1 | 11/2007 | Zohar et al. |
| 2007/0280245 A1 | 12/2007 | Rosberg |
| 2008/0005156 A1 | 1/2008 | Edwards et al. |
| 2008/0013532 A1 | 1/2008 | Garner et al. |
| 2008/0016301 A1 | 1/2008 | Chen |
| 2008/0028467 A1 | 1/2008 | Kommareddy et al. |
| 2008/0031149 A1 | 2/2008 | Hughes et al. |
| 2008/0031240 A1 | 2/2008 | Hughes et al. |
| 2008/0071818 A1 | 3/2008 | Apanowicz et al. |
| 2008/0095060 A1 | 4/2008 | Yao |
| 2008/0133536 A1 | 6/2008 | Bjorner et al. |
| 2008/0133561 A1 | 6/2008 | Dubnicki et al. |
| 2008/0184081 A1 | 7/2008 | Hama et al. |
| 2008/0205445 A1 | 8/2008 | Kumar et al. |
| 2008/0222044 A1 | 9/2008 | Gottlieb et al. |
| 2008/0229137 A1 | 9/2008 | Samuels et al. |
| 2008/0243992 A1 | 10/2008 | Jardetzky et al. |
| 2008/0267217 A1 | 10/2008 | Colville et al. |
| 2008/0300887 A1 | 12/2008 | Chen et al. |
| 2008/0313318 A1 | 12/2008 | Vermeulen et al. |
| 2008/0320151 A1 | 12/2008 | McCanne et al. |
| 2009/0006801 A1 | 1/2009 | Shultz et al. |
| 2009/0024763 A1 | 1/2009 | Stepin et al. |
| 2009/0037448 A1 | 2/2009 | Thomas |
| 2009/0060198 A1 | 3/2009 | Little |
| 2009/0063696 A1 | 3/2009 | Wang et al. |
| 2009/0080460 A1 | 3/2009 | Kronewitter, III et al. |
| 2009/0089048 A1 | 4/2009 | Pouzin |
| 2009/0092137 A1 | 4/2009 | Haigh et al. |
| 2009/0100483 A1 | 4/2009 | McDowell |
| 2009/0158417 A1 | 6/2009 | Khanna et al. |
| 2009/0175172 A1 | 7/2009 | Prytz et al. |
| 2009/0204961 A1 | 8/2009 | DeHaan et al. |
| 2009/0234966 A1 | 9/2009 | Samuels et al. |
| 2009/0245114 A1 | 10/2009 | Vijayaraghavan |
| 2009/0265707 A1 | 10/2009 | Goodman et al. |
| 2009/0274294 A1 | 11/2009 | Itani |
| 2009/0279550 A1 | 11/2009 | Romrell et al. |
| 2009/0281984 A1 | 11/2009 | Black |
| 2010/0005222 A1 | 1/2010 | Brant et al. |
| 2010/0011125 A1 | 1/2010 | Yang et al. |
| 2010/0020693 A1 | 1/2010 | Thakur |
| 2010/0054142 A1 | 3/2010 | Moiso et al. |
| 2010/0070605 A1 | 3/2010 | Hughes et al. |
| 2010/0077251 A1 | 3/2010 | Liu et al. |
| 2010/0082545 A1 | 4/2010 | Bhattacharjee et al. |
| 2010/0085964 A1 | 4/2010 | Weir et al. |
| 2010/0115137 A1 | 5/2010 | Kim et al. |
| 2010/0121957 A1 | 5/2010 | Roy et al. |
| 2010/0124239 A1 | 5/2010 | Hughes |
| 2010/0131957 A1 | 5/2010 | Kami |
| 2010/0169467 A1 | 7/2010 | Shukla et al. |
| 2010/0177663 A1 | 7/2010 | Johansson et al. |
| 2010/0225658 A1 | 9/2010 | Coleman |
| 2010/0232443 A1 | 9/2010 | Pandey |
| 2010/0246584 A1 | 9/2010 | Ferguson et al. |
| 2010/0290364 A1 | 11/2010 | Black |
| 2010/0318892 A1 | 12/2010 | Teevan et al. |
| 2011/0002346 A1 | 1/2011 | Wu |
| 2011/0022812 A1 | 1/2011 | van der Linden et al. |
| 2011/0113472 A1 | 5/2011 | Fung et al. |
| 2011/0154169 A1 | 6/2011 | Gopal et al. |
| 2011/0154329 A1 | 6/2011 | Arcese et al. |
| 2011/0181448 A1 | 7/2011 | Koratagere |
| 2011/0219181 A1 | 9/2011 | Hughes et al. |
| 2011/0225322 A1 | 9/2011 | Demidov et al. |
| 2011/0258049 A1 | 10/2011 | Ramer et al. |
| 2011/0261828 A1 | 10/2011 | Smith |
| 2011/0276963 A1 | 11/2011 | Wu et al. |
| 2011/0299537 A1 | 12/2011 | Saraiya et al. |
| 2012/0036325 A1 | 2/2012 | Mashtizadeh et al. |
| 2012/0069131 A1 | 3/2012 | Abelow |
| 2012/0173759 A1 | 7/2012 | Agarwal et al. |
| 2012/0218130 A1 | 8/2012 | Boettcher et al. |
| 2012/0221611 A1 | 8/2012 | Watanabe et al. |
| 2012/0230345 A1 | 9/2012 | Ovsiannikov |
| 2012/0239872 A1 | 9/2012 | Hughes et al. |
| 2013/0018722 A1 | 1/2013 | Libby |
| 2013/0018765 A1 | 1/2013 | Fork et al. |
| 2013/0031642 A1 | 1/2013 | Dwivedi et al. |
| 2013/0044751 A1 | 2/2013 | Casado et al. |
| 2013/0058354 A1 | 3/2013 | Casado et al. |
| 2013/0080619 A1 | 3/2013 | Assuncao et al. |
| 2013/0086236 A1 | 4/2013 | Baucke et al. |
| 2013/0094501 A1 | 4/2013 | Hughes |
| 2013/0103655 A1 | 4/2013 | Fanghaenel et al. |
| 2013/0117494 A1 | 5/2013 | Hughes et al. |
| 2013/0121209 A1 | 5/2013 | Padmanabhan et al. |
| 2013/0141259 A1 | 6/2013 | Hazarika et al. |
| 2013/0163594 A1 | 6/2013 | Sharma et al. |
| 2013/0250951 A1 | 9/2013 | Koganti |
| 2013/0263125 A1 | 10/2013 | Shamsee et al. |
| 2013/0282970 A1 | 10/2013 | Hughes et al. |
| 2013/0343191 A1 | 12/2013 | Kim et al. |
| 2014/0052864 A1 | 2/2014 | Van Der Linden et al. |
| 2014/0075554 A1 | 3/2014 | Cooley |
| 2014/0101426 A1 | 4/2014 | Senthurpandi |
| 2014/0108360 A1 | 4/2014 | Kunath et al. |
| 2014/0114742 A1 | 4/2014 | Lamontagne et al. |
| 2014/0123213 A1 | 5/2014 | Vank et al. |
| 2014/0181381 A1 | 6/2014 | Hughes et al. |
| 2014/0269705 A1 | 9/2014 | DeCusatis et al. |
| 2014/0279078 A1 | 9/2014 | Nukala et al. |
| 2015/0074291 A1 | 3/2015 | Hughes |
| 2015/0074361 A1 | 3/2015 | Hughes et al. |
| 2015/0078397 A1 | 3/2015 | Hughes et al. |
| 2015/0120663 A1 | 4/2015 | Le Scouarnec et al. |
| 2015/0170221 A1 | 6/2015 | Shah |
| 2015/0281099 A1 | 10/2015 | Banavalikar |
| 2015/0281391 A1 | 10/2015 | Hughes et al. |
| 2015/0334210 A1 | 11/2015 | Hughes |
| 2016/0014051 A1 | 1/2016 | Hughes et al. |
| 2016/0034305 A1 | 2/2016 | Shear et al. |
| 2016/0218947 A1 | 7/2016 | Hughes et al. |
| 2016/0255542 A1 | 9/2016 | Hughes et al. |

OTHER PUBLICATIONS

Riverbed, "Riverbed Introduces Market-Leading WDS Solutions for Disaster Recovery and Business Application Acceleration" (available at http://www.riverbed.com/about/news-articles/pressreleases/riverbed-introduces-market-leading-wds-solutions-fordisaster-recovery-and-business-application-acceleration.html (last visited Aug. 8, 2014)).

Tseng, Josh, "When accelerating secure traffic is not secure" (available at http://www.riverbed.com/blogs/whenaccelerati.html?&isSearch=true&pageSize=3&page=2 (last visited Aug. 8, 2014)).

Riverbed, "The Riverbed Optimization System (RiOS) v4.0: A Technical Overview" (explaining "Data Security" through segmentation) (available at http://mediacms.riverbed.com/documents/TechOverview-Riverbed-RiOS_4_0.pdf (last vistited Aug. 8, 2014)).

(56) References Cited

OTHER PUBLICATIONS

Riverbed, "Riverbed Awarded Patent on Core WDS Technology" (available at: http://www.riverbed.com/about/news-articles/pressreleases/riverbed-awarded-patent-on-core-wds-technology.html (last visited Aug. 8, 2014)).
Final Written Decision, Dec. 30, 2014, Inter Partes Review Case No. IPR2013-00403.
Final Written Decision, Dec. 30, 2014, Inter partes Review Case No. IPR2013-00402.
"IPsec Anti-Replay Window: Expanding and Disabling," Cisco IOS Security Configuration Guide. 2005-2006 Cisco Systems, Inc. Last updated: Sep. 12, 2006, 14 pages.
Singh et al. ; "Future of Internet Security—IPSEC"; 2005; pp. 1-8.
Muthitacharoen, Athicha et al., "A Low-bandwidth Network File System," 2001, in Proc. Of the 18th ACM Symposium on Operating Systems Principles, Banff, Canada, pp. 174-187.
"Shared LAN Cache Datasheet", 1996, <http://www.lancache.com/slcdata.htm>.
Spring et al., "A protocol-independent technique for eliminating redundant network traffic", ACM SIGCOMM Computer Communication Review, vol. 30, Issue 4 (Oct. 2000) pp. 87-95, Year of Publication: 2000.
Hong, B et al. "Duplicate data elimination in a SAN file system", In Proceedings of the 21st Symposium on Mass Storage Systems (MSS '04), Goddard, MD, Apr. 2004. IEEE.
You, L. L. and Karamanolis, C. 2004. "Evaluation of efficient archival storage techniques", In Proceedings of the 21st IEEE Symposium on Mass Storage Systems and Technologies (MSST).
Douglis, F. et al., "Application specific Delta-encoding via Resemblance Detection", Published in the 2003 USENIX Annual Technical Conference.
You, L. L. et al., "Deep Store an Archival Storage System Architecture" Data Engineering, 2005. ICDE 2005. Proceedings of the 21st Intl. Conf. on Data Eng.,Tokyo, Japan, Apr. 5-8, 2005, pp. 12.
Manber, Udi, "Finding Similar Files in a Large File System", TR 93-33 Oct. 1994, Department of Computer Science, University of Arizona. <http://webglimpse.net/pubs/TR93-33.pdf>. Also appears in the 1994 winter USENIX Technical Conference.
Knutsson, Bjorn et al., "Transparent Proxy Signalling", Journal of Communications and Networks, vol. 3, No. 2, Jun. 2001.
Definition memory (n), Webster's Third New International Dictionary, Unabridged (1993), available at <http://lionreference.chadwyck.com> (Dictionaries/Webster's Dictionary). Copy not provided in IPR2013-00402 proceedings.
Definition appliance, 2c, Webster's Third New International Dictionary, Unabridged (1993), available at <http://lionreference.chadwyck.com> (Dictionaries/Webster's Dictionary). Copy not provided in IPR2013-00402 proceedings.
Newton, "Newton's Telecom Dictionary", 17th Ed., 2001, pp. 38, 201, and 714.
Silver Peak Systems, "The Benefits of Byte-level WAN Deduplication" (2008).
Final Written Decision, Jun. 9, 2015, Inter Partes Review Case No. IPR2014-00245.

\* cited by examiner

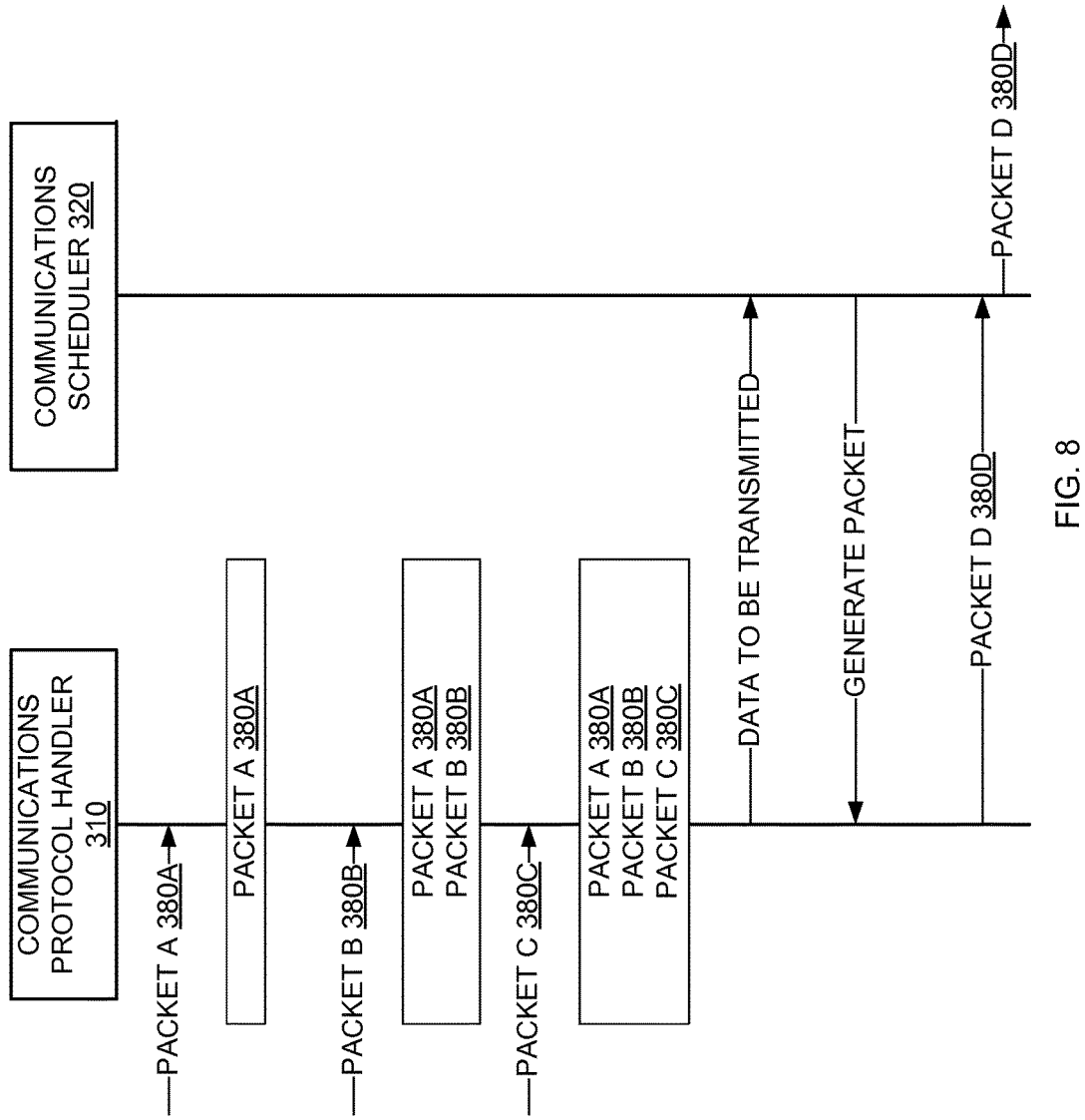

COMMUNICATIONS SCHEDULER

CROSS-REFERENCE TO RELATED APPLICATIONS

The present application is a continuation of U.S. patent application Ser. No. 11/498,491, filed Aug. 2, 2006, which is incorporated herein by reference in its entirety.

BACKGROUND

1. Technical Field

The present invention relates generally to data flow control over a network and more particularly to a communications scheduler controlling data flow over a network.

2. Description of Related Art

As transmission of network data over a communications network has become commonplace, users increasingly rely upon the speed and accuracy of network data transferral. One of the most common protocols to transmit network data is the transmission control protocol/internet protocol (TCP/IP). The TCP/IP protocol, like many protocols, organizes network data into packets and controls the transmission of packets over the communications network.

Slow-start is a part of the congestion control strategy of the TCP/IP protocol. Slow-start is used to avoid sending more packets than the communications network is capable of handling. Slow-start increases a TCP congestion window size until acknowledgements are not received for some packets. The TCP congestion window is the number of packets that can be sent without receiving an acknowledgment from the packet receiver. Initially, packets are slowly sent over the communications network. Transmission of the packets is increased until the communications network is congested. When acknowledgements are not received, the TCP congestion window is reduced. Subsequently, the number of packets sent without an acknowledgement is reduced and the process repeats.

The TCP/IP protocol can allocate bandwidth that is roughly inversely proportional to the long round trip time (RTT). Although many people generally expect bandwidth to be equally shared among users, the bandwidth is often in relation to the RTT ratio. In one example, two different users may be transmitting data. The first user may desire to transmit data to a local digital device with a 1 ms round trip time while the other user may desire to transmit data to another state with a 100 ms round trip time. The standard TCP/IP protocol will, on average, deliver 100× more bandwidth to the local device connection than to the out-of-state connection. The TCP/IP protocol does not consciously try to enforce any kind of explicit fairness policy. As a result, users that transmit data locally may receive better service at the unfair expense of those wishing to transmit data over longer distances.

FIG. 1 is a block diagram of a computer 100 configured to transmit network data in the prior art. The computer 100 depicts hardware and software elements related to transmission of network data. Other hardware and software of the computer 100 are not depicted for the sake of simplicity. The computer 100 comprises an application 110, a TCP/IP stack 120, a network device driver 130, and a network interface card 140. The network interface card 140 is coupled to a communications network over a link 150. The computer 100 can be any digital device configured to transmit network data.

The TCP/IP stack 120 receives the network data from the application 110 and proceeds to organize the network data into packets. Depending on the type of network, a packet can be termed a frame, block, cell, or segment. The TCP/IP stack 120 buffers the network data prior to organizing the network data into packets and subsequently buffers the packets.

The network device driver 130 enables an operating system of the computer 100 to communicate to the network interface card 140. The network interface card 140 is any device configured to send or receive packets over the communications network. The network device driver 130 configures the network interface card 140 to receive the packets and subsequently transmit the packets over the link 150 to the communications network.

In one example, the TCP/IP stack 120 of the sending computer 100 will not send another packet across the communications network until an acknowledgement from the destination is received. The number of packets between acknowledgments increases until a packet is lost and an acknowledgment is not received. At which point the TCP/IP stack 120 slows down the transmission of packets and, again, slowly increases the speed of transmission between acknowledgments until, again, a packet is lost. As a result, the transmission of network data by the TCP/IP stack 120 can be graphed as a saw tooth; the transmission of network data increases until packets are lost and then transmission drops to a slower speed before repeating the process. Under the TCP/IP approach, packets are often transmitted at speeds below the network's capacity. When the packets are not being sent slowly, however, the communications network quickly becomes congested and the process repeats.

While the TCP/IP stack 120 waits to transmit the packets, the packets are buffered. If the TCP/IP stack 120 transmits too slowly, the buffers may overrun and packets may be lost. Further, the process of buffering and retrieving the buffered packets slows packet transmission and increases the costs of hardware.

The TCP/IP stack 120 delivers different performance depending on the distance that packets are to travel. The TCP/IP stack 120 generates packets based on received network data. The destination of the packets dictates the order in which the packets are transmitted. Packets to be transmitted longer distances may be transmitted slower than packets to be transmitted shorter distances. As a result, this procedure may not be fair to users wishing to transmit mission critical data long distances.

Performance enhancing proxies have been used to improve performance of local networks by overriding specific behaviors of the TCP/IP stack 120. In one example, individual digital devices on a local area network are configured to transmit packets based on a proxy protocol. The proxy protocol overrides certain behaviors of the TCP/IP stack 120 to improve the speed of transmission of network data. However, the performance enhancing proxy does not find bottlenecks on networks, control the transmission of network data based on bottlenecks, nor improve fairness in packet transmission.

SUMMARY OF THE INVENTION

The invention addresses the above problems by providing a communications scheduler that controls data flow over a network. The communications scheduler controls the transmission of packets over a path at a rate based on at least one metric. A system for providing communications over a communications network includes a communications interface and a processor. The communications interface communicates over the communications network. The processor directs a communications scheduler to determine at least one metric for a path within the communications network. The processor also selects a data flow for the path and determines whether to transmit a packet in the selected data flow based on the at least one metric. The processor then directs a communications protocol handler to generate the packet for the selected data flow.

The communications interface may transmit the packet in the selected data flow. The communications protocol handler may comprise a transmission control protocol/internet (TCP/IP) protocol stack. At least one metric may be a bandwidth or a bandwidth estimate.

The processor may direct the communications protocol handler to receive information from an application to be included in the packet. The processor may also direct the communications scheduler to determine if the data flow has information to send prior to selecting the data flow of the path. To select the data flow, the processor may direct the communications scheduler to determine a priority of data flows and determine the data flow to generate the packet based on the priority of data flows determination and the metric. The priority of data flows may be based on a fairness policy.

A system for providing communications over a communications network includes a communications scheduler module and a communications network handler module. The communications scheduler module determines at least one metric for a path within the communications network and selects a data flow for the path. The communications scheduler module determines whether to transmit a packet in the selected data flow based on the at least one metric. Further, the communications scheduler module directs a communications protocol handler to generate the packet in the selected data flow. The communications network handler receives the direction from the communications scheduler to generate the packet in the selected data flow and generates the packet based on the direction.

A method for providing communications over a communications network includes determining at least one metric for a path within the communications network, selecting a data flow for the path, determining whether to transmit a packet in the selected data flow based on the at least one metric, and directing a communications protocol handler to generate the packet for the selected data flow.

A software product for providing communications over a communications network includes a communications scheduler software and a storage medium to store the communications scheduler software. The communications scheduler software directs a processor to determine at least one metric for a path within the communications network and select a data flow for the path. The communications scheduler software can also determine whether to transmit a packet in the selected data flow based on the at least one metric and direct a communications protocol handler to generate the packet for the selected data flow.

The system advantageously transmits packets at a rate based on a path's capacity to carry packets. By determining a metric for a selected path, packets of network data can be transmitted to maximize throughput without waiting for lost packets or acknowledgments to prove network congestion. As a result, the overall speed of packet transmission can be improved without sacrificing reliability. Network congestion which can affect other traffic within the path can be avoided by reducing the transmission of packets above what the path can carry. Further, packets may be generated at the speed of packet transmission advantageously reducing or eliminating the need for packet buffering. The reduction or elimination of buffers reduces hardware expense and may increase the speed of packet transmission.

BRIEF DESCRIPTION OF THE DRAWINGS

FIG. 8 is an illustration of an exemplary implementation of the operation of a network device of the invention.

DETAILED DESCRIPTION OF THE INVENTION

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

A system for providing communications over a communications network includes a communications interface and a processor. The communications interface communicates over the communications network. The processor directs a communications scheduler to determine at least one metric for a path within the communications network. The processor also selects a data flow for the path and determines whether to transmit a packet in the selected data flow based on the at least one metric. The processor then directs a communications protocol handler to generate the packet for the selected data flow.

The system can advantageously provide reliable transmission of packets through a communications network more efficiently and more fairly than that available in the prior art. Instead of increasing speeds to the point of network congestion before slowing transmission, packets may be transmitted through the communications network at speeds that more closely approximate the capacity of the packet path. As a result, network congestion is reduced and high data transmission rates can be maintained.

Further, the system can advantageously provide fair transmission of packets through the communications network. Instead of transmitting packets based on the conservation of bandwidth over long distances, packets can be transmitted based on an equitable policy. As a result, packets from each user may be transmitted over the communication network at a rate equal to that of other users regardless of the RTT of the transmission. Further, packets may be transmitted at a faster rate based on the relative importance of the packets, the identity of the user providing network data, or the type of digital device generating the packets. Other fairness policies are also possible.

Figure 1:
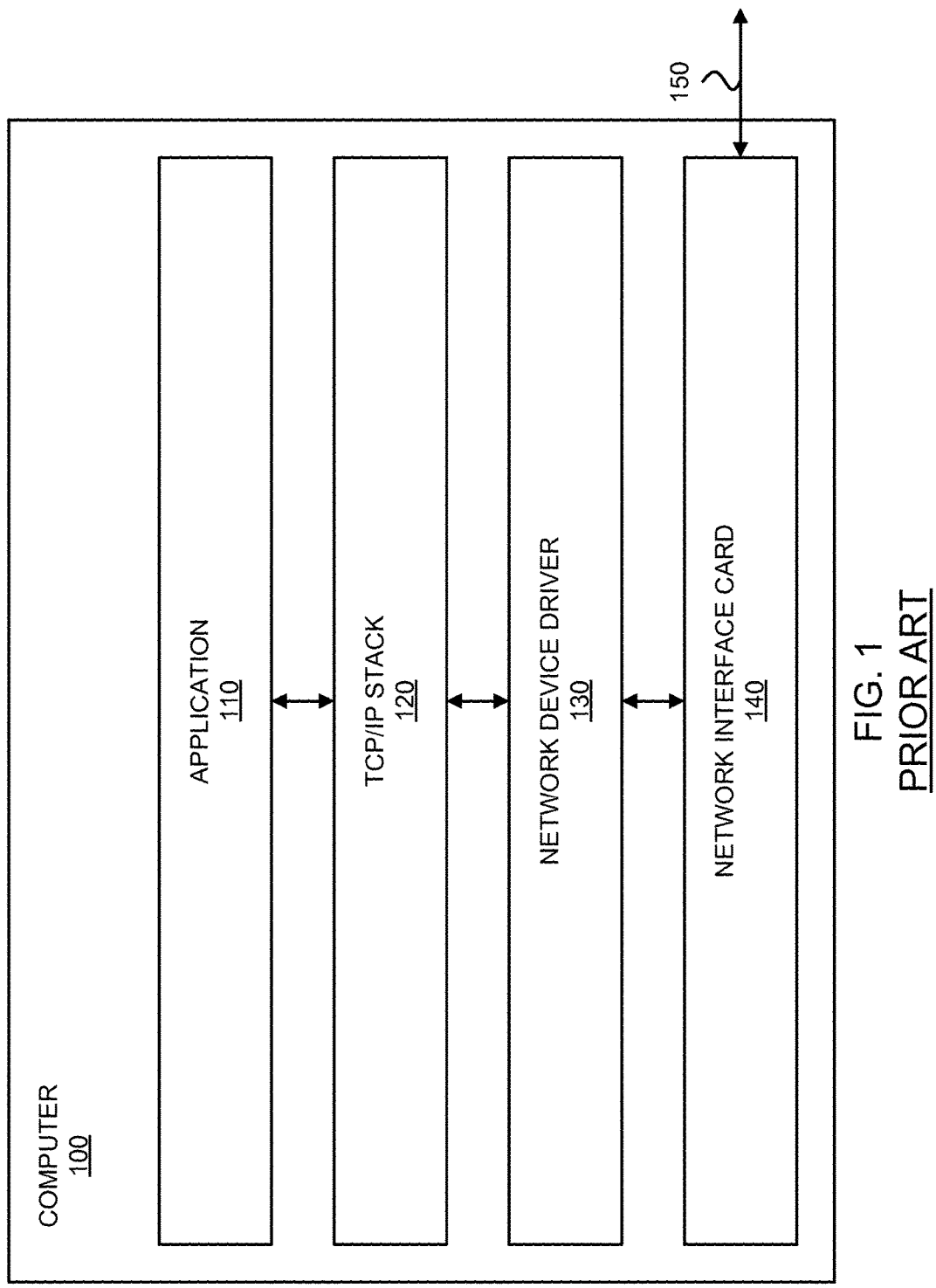
FIG. 1 is a block diagram of a computer configured to transmit network data in the prior art.
Figure 2:
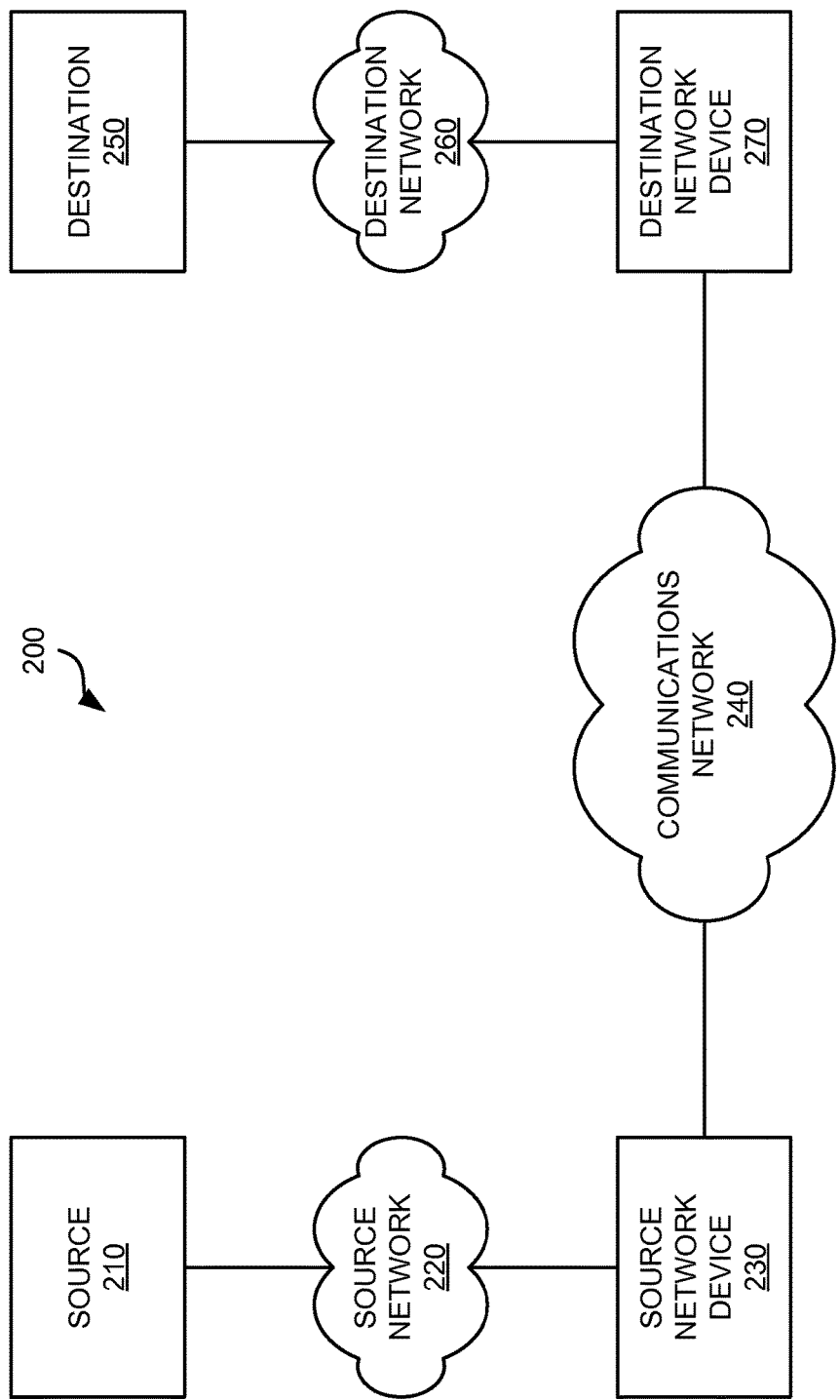
FIG. 2 is an illustration of a network environment in an exemplary implementation of the invention.

FIG. 2 is an illustration of a network environment 200 in an exemplary implementation of the invention. The network environment 200 includes a source 210, an optional source network 220, a source network device 230, a communications network 240, a destination 250, an optional destination network 260, and a destination network device 270. The source 210 is coupled to the source network device 230 over the source network 220. The source network device 230 is coupled to the communications network 240. The communications network 240 is coupled to the destination network device 270, which is coupled to the destination 250 over the destination network 260.

Source 210 can be any digital device configured to transmit network data. Similarly, the destination 250 is any digital device configured to receive network data. Examples of digital devices include, but are not limited to, computers, personal digital assistants, and cellular telephones. The source network 220 and the destination network 260 are any networks that couple a digital device (e.g., source 210) to a network device (e.g., source network device 230). The source network 220 and the destination network 260 can be a wired network, a wireless network, or any combination.

The communications network 240 can be any network configured to carry network data and/or packets between the source network device 230 and the destination network device 270. In one example, the communications network 240 is the Internet.

The embodiments in FIGS. 2-5 depict an example of packets being transmitted from the source 210 to the destination 250 through the source network device 230, the communications network 240, and the destination network device 270. Other embodiments may include packets being transmitted directly from the destination 250 to the source 210. In an example, the source 210 and the destination 250 may comprise the source network device 230 and the destination network device 270, respectively. While there are numerous variations in where packets are generated and transmitted, the figures below describe one example of packet transmissions from the source 210 to the destination 250 for the sake of simplicity.

The source network device 230 and the destination network device 270 are any device or system configured to process and exchange packets over the communications network 240. A path is any route the packet may take from the source network device 230 to the destination network device 270. The configuration of the source network device 230 and the destination network device 270 are described in further detail below in FIG. 6. One example of the source network device 230 and the destination network device 270 is an appliance in a network memory architecture, which is described in U.S. patent application Ser. No. 11/202,697 entitled "Network Memory Architecture for Providing Data Based on Local Accessibility" filed on Aug. 12, 2005, which is hereby incorporated by reference.

Figure 3:
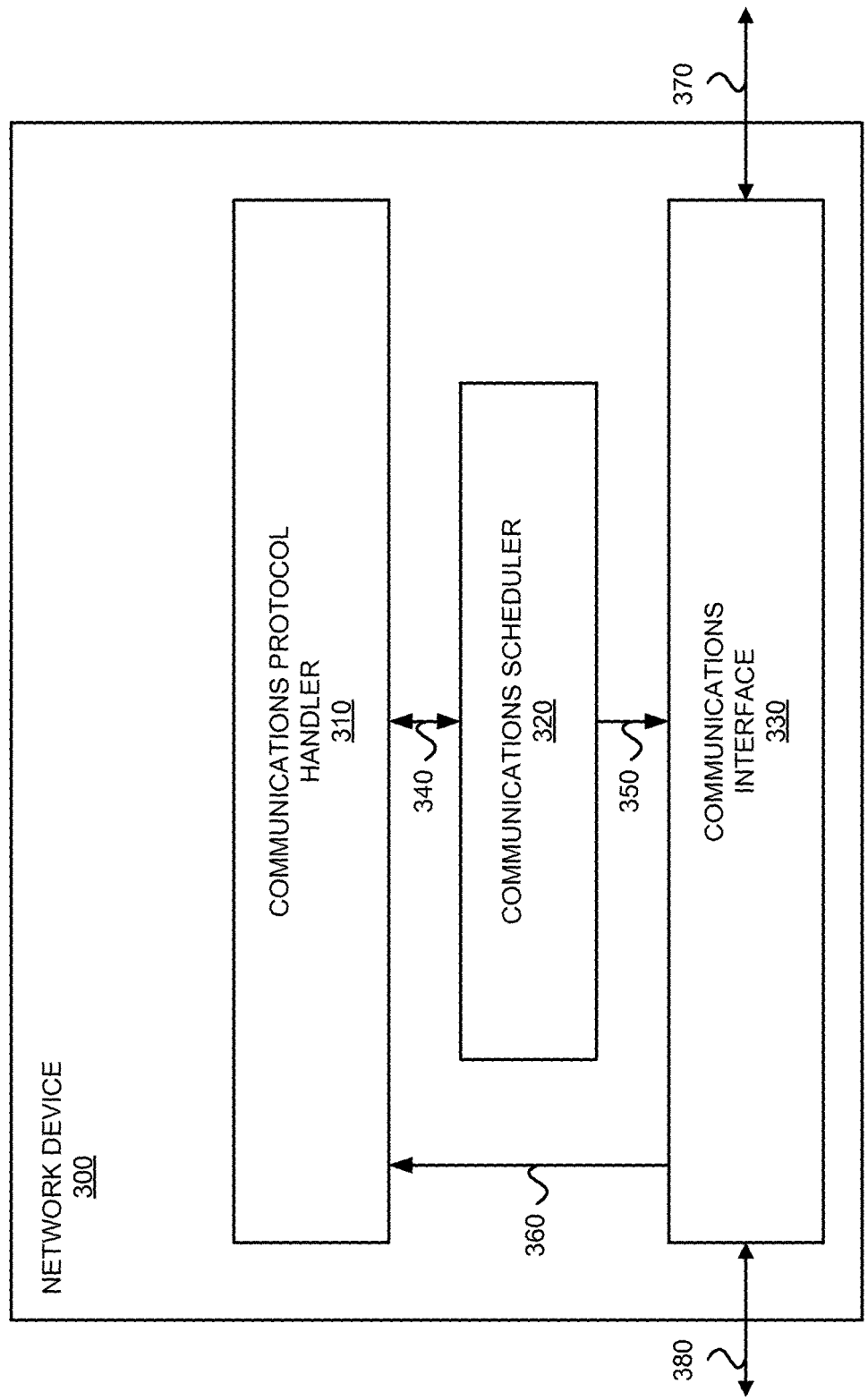
FIG. 3 is an illustration of a network device in an exemplary implementation of the invention.

FIG. 3 is an illustration of a network device 300 in an exemplary implementation of the invention. The network device 300 may be the source network device 230 (FIG. 2) or the destination network device 270 (FIG. 2). The network device 300 includes a communications protocol handler 310, a communications scheduler 320, and a communications interface 330. The communications protocol handler 310 is coupled to the communications scheduler 320 over scheduler link 340. The communications scheduler 320 is further coupled to the communications interface 330 over communications link 350. The communications interface 330 is coupled to the communications protocol handler 310 over handler link 360, the communications network 240 (FIG. 2) over network link 370, and the source network 220 over the source link 380. The communications protocol handler 310, the communications scheduler 320, and the communications interface 330 may be software modules. Software modules comprise executable code that may be processed by a processor (not depicted).

The communications protocol handler 310 is any combination of protocols configured to organize network data into packets. In one example, the communications protocol handler 310 is a TCP/IP stack. In other examples, the communications protocol handler 310 is a User Datagram Protocol (UDP) stack or a Real-time Transport Protocol (RTP) stack. The communications protocol handler 310 may receive network data from an application (not depicted). The communications protocol handler 310 organizes the network data from the application into packets which are to be transmitted over the communications network 240. The communications protocol handler 310 may receive the network data from the application directly. Alternately, the application can reside on the source 210 outside of the network device 300. In an example, the communications interface 330 of the network device 300 receives the network data from the application over the source link 380. The communications interface 330 then forwards the application data over the handler link 360 to the communications protocol handler 310.

The communications scheduler 320 is configured to control the transmission of the packets from the communications protocol handler 310. The communications scheduler 320 can determine at least one metric for a path (discussed in FIG. 2, herein) on the communications network 240 and then control the flow of packets on that path based on the one or more metrics. The metric is any measured value related to a quality, operator, or performance of the path. In one example, the metric is a bandwidth estimate for the path. The bandwidth estimate is a value that estimates the number of packets that may be sent over a path during a predetermined time (e.g., the capacity of the path to transmit packets without congestion). If the bandwidth estimate of the path is high, the path may be capable of carrying a large number of packets. Otherwise, if the bandwidth estimate is low, the path may be capable of carrying a smaller number of packets.

The communications scheduler 320 can determine the bandwidth estimate of any number of paths on the communications network 240. In one example, the communications scheduler 320 transmits probe packets through the communications interface 330 over the communications network 240 to another network device 300. The communications scheduler 320 of the other network device 300 receives the probe packet and transmits a monitor packet back to the originating network device 300. The communications scheduler 320 of the originating network device 300 receives the monitor packet and determines a bandwidth estimate for the path. The determination of the metric is further discussed in FIG. 5.

The communications scheduler 320 can control the transmission of the packets from the communications protocol handler 310 based on the metric of the path. In one example, the communications scheduler 320 limits the number of packets transmitted to the capacity of the path based on the metric. This process is further discussed in FIG. 4. Although the communications protocol handler 310 may comprise a protocol that controls the transmission of network data to avoid congestion (e.g., TCP/IP stack methodology), the communications scheduler 320 may override this function.

By determining the capacity of the path and controlling the flow of packets over the communications network 240, the communications scheduler 320 can increase or optimize the speed in which network data flows across the communications network 240. The prior art protocols typically begin at slow-start and increase speed until congestion appears. Subsequently, the prior art protocols slow down the rate of transmission and slowly increase again. The communications scheduler 320 can maintain speeds that the path will allow. The ultimate throughput the communications scheduler 320 achieves may be faster than the average speed of the prior art protocols.

In some embodiments, the communications scheduler 320 pulls packets from the communications protocol handler 310 obviating the need for buffers. The communications protocol handler 310 can generate a packet at the command of the communications scheduler 320. In one example, the speed at which packets are generated and transmitted is equivalent to the bandwidth estimate. Since the communications scheduler 320 is pulling packets from the communications handler 310 rather than determining transmission rates after packet generation, the packets need not be buffered before transmission. As a result, buffering may be reduced or eliminated which can increase the speed of transmission and/or reduce hardware costs.

The communications interface 330 is coupled to the network device 300, the source 210, the source network 220, and/or the communications network 240. The communications interface 330 can transmit the packets received over the communications link 350 from the communications scheduler 320 to the communications network 240. The communications interface 330 also provides packets received from the communications network 240 to the communications protocol handler 310 over the handler link 360. In some embodiments, the communications interface 330 sends any monitor packets received from another network device 300 to the communications scheduler 320. Further, the communications interface 330 may send any network data received from an application over the source link 380 to the communications protocol handler 310 where the network data will be subsequently organized into packets to prepare for further transmission over the communications network 240. In some embodiments, the communications interface 330 is linked to both the source network 220 and the communications network 240 over a single link (e.g., the network link 370 or the source link 380).

Figure 4:
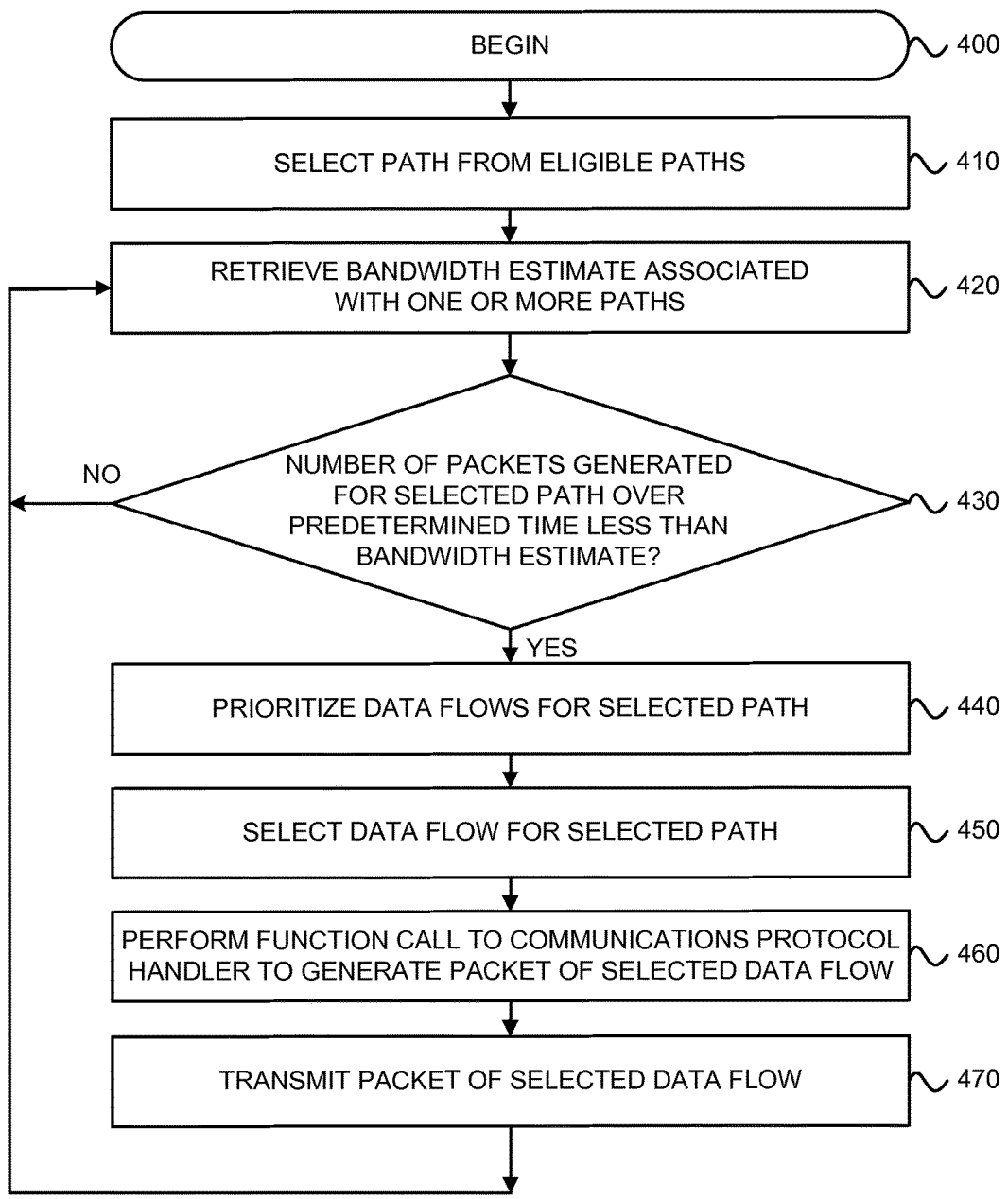
FIG. 4 is a flow chart for the transmission of network data in an exemplary implementation of the invention.

FIG. 4 is a flow chart for the transmission of network data in an exemplary implementation of the invention. FIG. 4 begins in step 400. In step 410, the communications scheduler 320 (FIG. 3) selects a path from eligible paths. An eligible path can be any path with a bandwidth estimate, a path with data to send, or any path that meets a predetermined quality of service criteria. Alternatively, the eligible path can be any path with a bandwidth estimate equal to or greater than a predetermined estimate. In another example, the eligible paths can be determined to be a predetermined percentage of paths with a higher bandwidth estimate than the others.

The communications scheduler 320 can select a path from the eligible paths based on the bandwidth estimate. In one example, the communications scheduler 320 selects the path with the highest bandwidth estimate. In some embodiments, the paths may be prioritized. Specific paths may be weighed based on the properties of one or more networks within the communications network 240. In one example, the path may extend through a virtual private network (VPN) or a network with a bandwidth guarantee.

In step 420, the communications scheduler 320 retrieves a bandwidth estimate associated with one or more paths. The communications scheduler 320 can continue to retrieve or receive bandwidth estimates during any step of FIG. 4. The process of determining a bandwidth estimate is further discussed in FIG. 5.

In step 430, the communications scheduler 320 determines if the number of packets generated over the selected path for a predetermined time is less than the bandwidth estimate of the selected path. In one example, the communications scheduler 320 tracks the number of packets that have been transmitted over each path as well as when the packets where transmitted. If the number of packets transmitted over the selected path during a predetermined period of time is greater than the bandwidth estimate, the communications scheduler 320 retrieves the bandwidth estimate associated with other paths in step 420. In some embodiments, the communications scheduler 320 subsequently selects a new path from eligible paths before returning to step 430. In other embodiments, if the number of packets transmitted over the selected path during a predetermined period of time is greater than the bandwidth estimate, FIG. 4 ends. If the number of packets generated for a selected path is less than the bandwidth estimate, then the communications scheduler 320 can prioritize the data flows for the selected path in step 440.

In one example, the communications scheduler 320 queries the communications protocol handler 310 (FIG. 3) for available data flows. A data flow comprises related network data or packets. In one example, packets belonging to the same data flow comprise the same source IP address, destination IP address, IP protocol, source port, and destination port. There may be a separate data flow for separate applications, sessions, or processes. Each data flow may also be prioritized based on the purpose of the network data within the data flow or the source of the data flow (e.g., the digital device that generated the data flow or a user of the digital device that generated the data flow). In some embodiments, the communications protocol handler 310 notifies the communications scheduler 320 of all data flows without being queried.

In exemplary embodiments, the data flows are weighted depending upon the application that originated the data flow, the user of the application, the number of data flows already sent from the application (or the user), and the number of packets already sent from that data flows. In one example, the data flows are all given equal weight and a packet is sent from each eligible data flow in turn (e.g., a round robin approach). In another example, certain applications or users are given priority over other applications or other users (e.g., by weighing certain applications higher than others). Packets generated by a particular source IP address or transmitted to a particular destination IP address may also be given priority. There may be many different methodologies in weighing the data flows.

In step 450, the communications scheduler 320 selects the data flows for the selected path. In one example, the data flows are selected based on an assigned weight or priority. In some embodiments, the data flows are re-weighted (i.e., re-prioritized) after a packet is transmitted.

Instead of transmitting packets based on the round trip time of packets (e.g., the distance that packets are transmitted), packets can be transmitted based on a configurable fairness policy. A fairness policy is any policy that allows for equitable transmission of packets over the communications network. In one example, the fairness policy dictates that every data flow be given equal weight. In another example, the fairness policy dictates that certain users or data flows are more important (e.g., time sensitive) than others and therefore are given greater weight. The fairness policy can base fair transmission of packets on the saliency of users and/or data rather than the preservation of bandwidth over long distances within the communications network 240 (FIG. 2).

In step 460, the communications scheduler 320 performs a function call to the communications protocol handler 310 to generate a packet from the selected data flow. In one example, the communications protocol handler 310 receives network data from an application (not depicted). The network data is organized into data flows. The communications scheduler 320 prioritizes the data flows and selects a data flow. Subsequently, the communications scheduler 320 provides a function call to command the communications protocol handler 310 to organize the network data into packets.

In some embodiments, the communications protocol handler 310 does not generate packets without a function call from the communications scheduler 320. In one example, the packets are not buffered prior to transmission over the network link 370 (FIG. 3). As a result of the communications scheduler 320 pulling packets from the communications protocol handler 310, buffering the packets prior to transmission may be reduced or eliminated.

In step 470, the communications scheduler 320 transmits the packet of the selected data flow. In one example, the communications scheduler 320 commands the communications interface 330 to transmit the packet over the network link 370. The communications scheduler 320 then retrieves a new bandwidth estimate associated with one or more paths in step 420 and the process can continue. In other embodiments, FIG. 4 ends after step 470.

In some embodiments, the communications scheduler 320 overrides the behavior of the communications protocol handler 310 to transmit packets at the bandwidth estimate. In one example, the communications scheduler 320 overrides the cwnd behavior to control the size of the congestion window of the TCP/IP stack (i.e., the communications protocol handler 310). As a result, the communications scheduler 320 can replace or modify the cwnd behavior (or any behavior that influences the congestion window) to cause the communications protocol handler 310 to transmit packets at the rate based on the bandwidth estimate.

Figure 5:
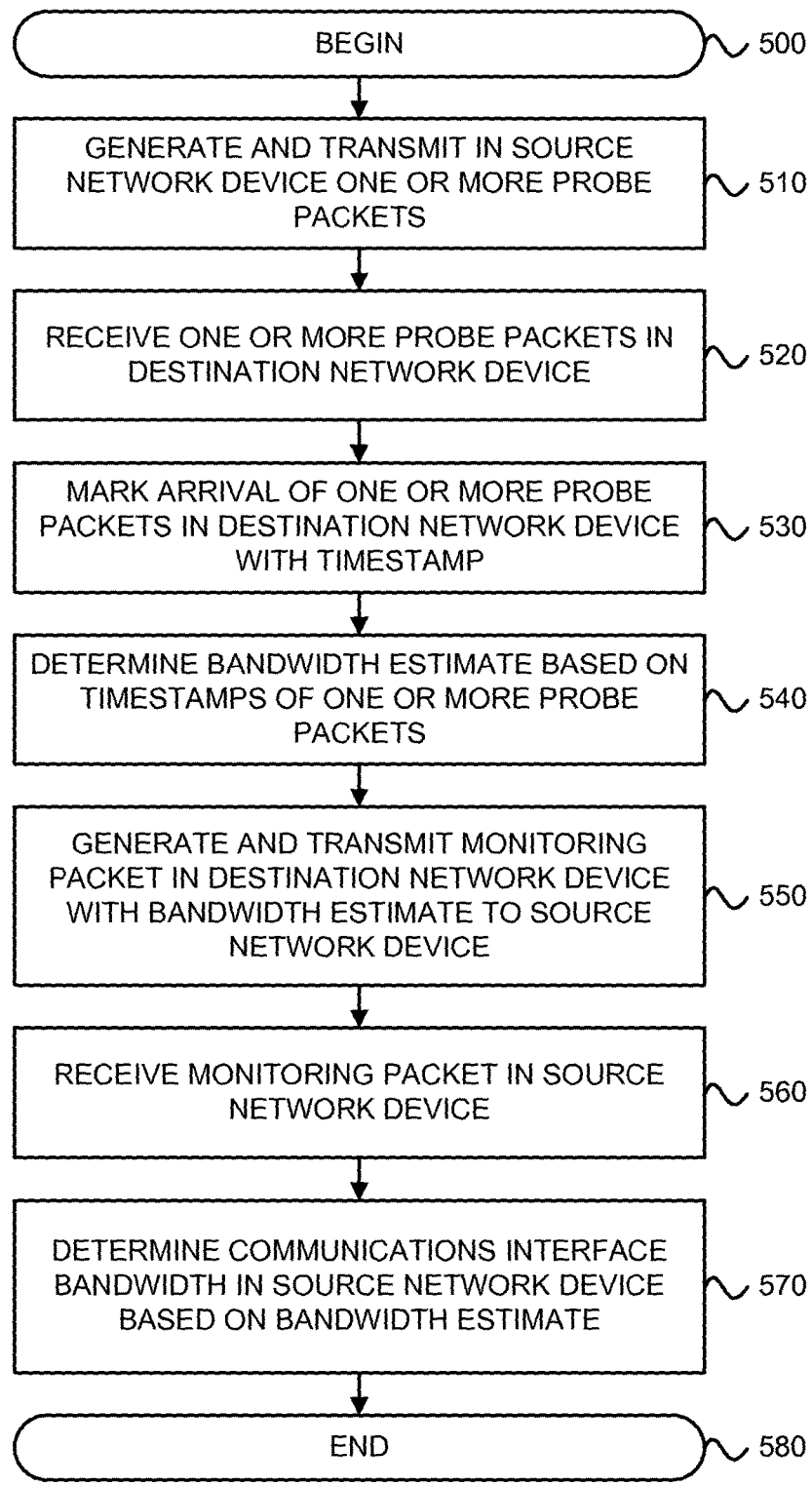
FIG. 5 is a flow chart for the determination of the bandwidth estimate in an exemplary implementation of the invention.

FIG. 5 is a flow chart for the determination of the bandwidth estimate in an exemplary implementation of the invention. FIG. 5 begins in step 500. In step 510, the source network device 230 (FIG. 2) generates and transmits one or more probe packets. A probe packet is a packet sent by the source network device 230 to a destination network device 270 (FIG. 2) to determine a metric for a particular path. The metric may be a bandwidth estimate. In an example, the communications scheduler 320 (FIG. 3) of the source network device 230 generates and subsequently transmits one or more probe packets over the communications network 240 (FIG. 2). In some embodiments, the probe packets are stamped with a transmission timestamp based on the time of transmission. Further, the probe packets may be stamped with a selected path over which the probe packet is to be sent.

In step 520, the destination network device 270 receives the probe packets from the source network device 230. In an example, the communications scheduler 320 of the destination network device 270 receives the probe packets. The destination network device 270 marks the arrival of the one or more probe packets with a timestamp in step 530. In one example, the destination network device 270 may collect probe information associated with the one or more probe packets including, but not limited to, the source network device 230 that sent the one or more probe packets, the path over which the probe packet(s) was sent, and/or the transmission timestamp of the probe packet(s).

In step 540, the destination network device 270 determines the bandwidth estimate of the selected path based on the timestamp(s) of the one or more probe packets. In some embodiments, the destination network device 270 determines the bandwidth estimate by determining the number of eligible probe packets received over a predetermined time. Eligible probe packets can be probe packets with timestamps within the predetermined time. In some embodiments, the destination network device 270 determines the bandwidth estimate based on the inter-arrival time between probe packets (e.g., the time between receipt of successive probe packets).

In step 550, the destination network device 270 generates and transmits a monitoring packet with the bandwidth estimate to the source network device 230. In one example, the communications scheduler 320 of the destination network device 270 generates and transmits the monitoring packet to the communications scheduler 320 of the source network device 230.

In step 560, the source network device 230 receives the monitoring packet from the destination network device 270. In some embodiments, the destination network device 270 transmits the monitoring packet over the same selected path as the one or more probe packets. The source network device 230 can confirm the bandwidth estimate contained within the monitoring packet or modify the bandwidth estimate based on the time when the monitoring packet was received. In one example, the destination network device 270 transmits the monitoring packet with a timestamp to allow the source network device 230 to re-calculate the bandwidth estimate for the selected path. In other embodiments, the destination network device 270 transmits the monitoring packets with the timestamp over a different path to allow the source network device 230 to receive the bandwidth estimate for the selected path and calculate the bandwidth estimate for the different path.

In step 570, the source network device 230 determines the bottleneck based on the bandwidth estimate. In one example, the communications scheduler 320 pulls packets from the communications protocol handler 310 based on the bandwidth estimate. The pulled packets are subsequently transmitted over the communications network 240 by the communications interface 330.

In other embodiments, the source network device 230 transmits probe packets without timestamps to the destination network device 270 over a selected path. The destination network device 270 receives the probe packets and transmits monitoring packets with timestamps to the source network device 230 over the same path. The source network device 230 receives the monitoring packets and then determines the bandwidth estimate of the path based on the timestamps of the monitoring packets.

Many different probe packets may be sent over many paths from a source network device 230 to many different destination network devices 270 during a given time. By continuously discovering new paths and modifying the bandwidth estimates of existing paths, the source network device 230 can increase the through-put of packets to the destination 250 (FIG. 2) without continuously decreasing and increasing the speed of packet transmission when congestion occurs.

Figure 6:
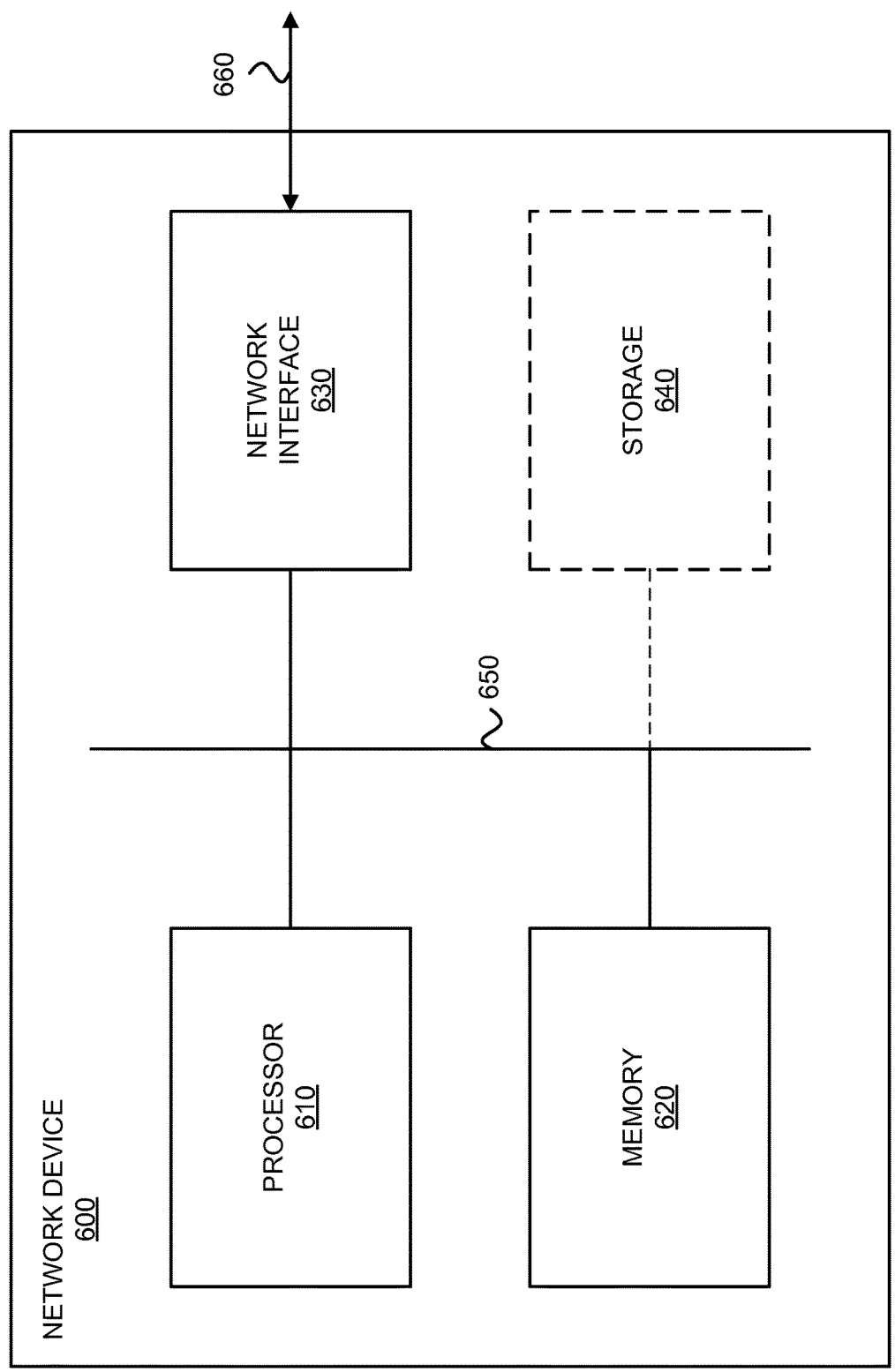
FIG. 6 is a block diagram of the network device in an exemplary implementation of the invention.

FIG. 6 is a block diagram of a network device 600 in an exemplary implementation of the invention. The network device 600 may have a similar configuration as the source network device 230 (FIG. 2) and/or the destination network device 270 (FIG. 2). The network device 600 includes a processor 610, a memory 620, a network interface 630, and an optional storage 640 which are all coupled to a system bus 650. The processor 610 is configured to execute executable instructions.

The memory 620 is any memory configured to store data. Some examples of the memory 620 are storage devices, such as RAM or ROM.

The network interface 630 is coupled to the communications network 240 (FIG. 2) and the source 210 (FIG. 2) via the link 660. The network interface 630 is configured to exchange communications between the source 210, the communications network 240, and the other elements in the network device 600. In some embodiments, the network interface 630 may comprise a Local Area Network interface for the source 210 and a Wide Area Network interface for the communications network 240.

The optional storage 640 is any storage configured to retrieve and store data. Some examples of the storage 640 are hard drives, optical drives, and magnetic tape. The optional storage 640 can comprise a database or other data structure configured to hold and organize data. In some embodiments, the network device 600 includes memory 620 in the form of RAM and storage 640 in the form of a hard drive.

The above-described functions can be comprised of executable instructions that are stored on storage media. The executable instructions can be retrieved and executed by the processor 610. Some examples of executable instructions are software, program code, and firmware. Some examples of storage media are memory devices, tape, disks, integrated circuits, and servers. The executable instructions are operational when executed by the processor to direct the processor to operate in accord with the invention. Those skilled in the art are familiar with executable instructions, processor(s), and storage media.

Figure 7:
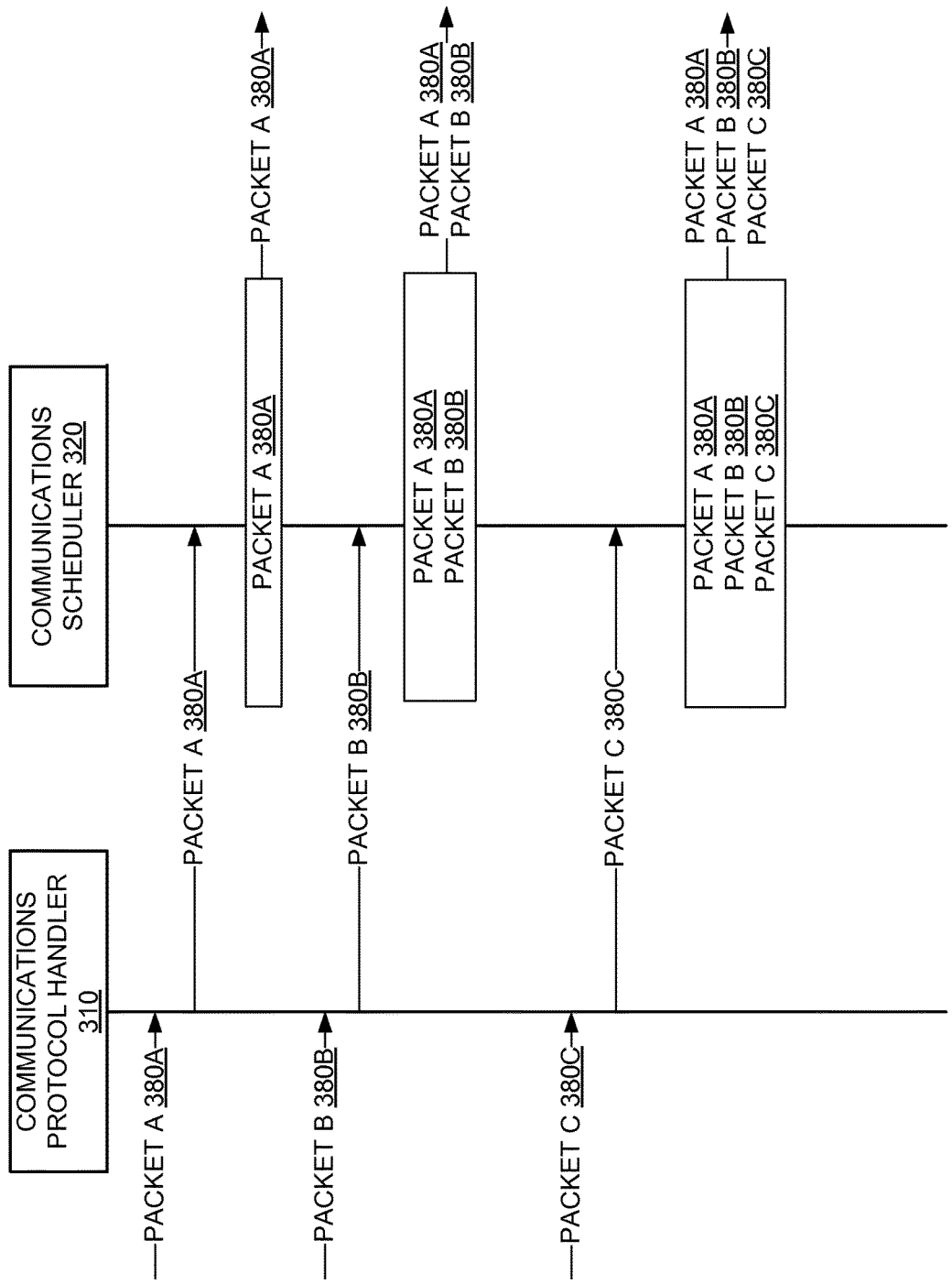
FIG. 7 is an illustration of an exemplary implementation of the operation of a network device in the prior art.

FIG. 7 is an illustration of an exemplary embodiment of the operation of a network device 300 in the prior art. The communications protocol handler 310 may receive application data over source link 380. In the exemplary embodiment depicted, communications protocol handler 310 may be a TCP/IP stack. The communications protocol handler 310 may receive Packet A 380A of a specified size, and forward that packet to the communications scheduler 320, which may then place the data packet in its queue for transmission over the network. Communications protocol handler 310 may then receive Packet B 380B and also forward that packet to the communications scheduler 320, which in turn may add Packet B 380B to its queue for transmission over the network. Communications protocol handler 310 may then receive Packet C 380C and forward that packet to the communications scheduler 320, which in turn may add Packet C 380C to its queue for transmission over the network. Thus, communications scheduler 320 may have three separate data packets in its queue for transmission over the network.

FIG. 8 is an illustration of an exemplary embodiment of the operation of a network device 300 according to the present invention. The communications protocol handler 310 may receive application data over source link 380. In the exemplary embodiment depicted, communications protocol handler 310 be a TCP/IP stack. The TCP/IP stack may receive Packet A 380A of a specified size, which is then kept by the TCP/IP stack. Communications protocol handler 310 may then receive Packet B 380B, which is also added to the data held at the TCP/IP stack. Communications protocol handler 310 may then receive Packet C 380C, which is subsequently added to the data held at the TCP/IP stack. The communications scheduler 320 may then be informed that the TCP/IP stack has data to be transmitted. As discussed herein, the communications scheduler 320 may select a suitable path and prioritize data flows for the selected path. The communications scheduler 320 may then direct the TCP/IP stack to generate one or more data packets for the data flow to be transmitted over the network. In an exemplary embodiment, the communications protocol handler 310 may then generate Packet D 380D, containing the data from Packets A, B, and C, and send that packet to the communications scheduler 320, which may in turn direct it to the communications interface 330 for transmission over the network. Packet D 380D may be a single data packet or multiple data packets.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A system for providing network communications, the system comprising:
   a TCP/IP stack module stored in memory and executed by a processor to:
      receive a plurality of original application data packets from a data flow, inform a communications scheduler module that the data flow has data to be transmitted over a network, and generate at least one data packet for the data flow from the plurality of original application data packets to be transmitted over the network when directed by the communications scheduler module;
   the communications scheduler module stored in memory and executed by the processor to:
      determine the capacity of a network path, select a suitable network path, select a prioritized data flow for the selected network path, and direct the TCP/IP stack module to generate the at least one data packet for the selected prioritized data flow from the application data in the selected prioritized data flow for immediate transmission of the selected prioritized data flow over the network, overriding standard TCP flow control; and
   a communications interface module stored in memory and executed by the processor to transmit the at least one data packet for the selected prioritized data flow via the selected network path at an optimal transmission rate, regardless of TCP flow control status.

2. The system of claim 1, wherein the execution of the communications scheduler module to determine the capacity of the network path includes determining a bandwidth estimate.

3. The system of claim 1, wherein the communications interface module transmits the at least one data packet for the data flow via the selected network path at a rate based on a bandwidth estimate for the capacity of the network path.

4. The system of claim 1, wherein the communications scheduler module is executable to determine whether a data flow has information to send prior to selecting the data flow for the network path.

5. The system of claim 1, wherein the communications scheduler module is executable to determine respective priorities of data flows and select the data flow based on the priorities and the capacity of the network path.

6. The system of claim 1, wherein the prioritized data flow is selected based on a fairness policy.

7. The method of claim 1, wherein the prioritized data flow is selected based on at least one of the application that originated the data flow, the user of the application, the number of data flows previously sent from the application or the user, and the number of packets previously sent from that data flow.

8. A method for providing network communications, the method comprising:
receiving at a TCP/IP stack module application data in a plurality of original application data packets from a data flow
informing a communications scheduler module that the data flow has data to be transmitted over a network
receiving an instruction at the TCP/IP stack module from the communications scheduler module to send the data to the communications scheduler module;
generating by the TCP/IP stack module at least one data packet for the data flow from the plurality of original application data packets to be transmitted over the network; and
sending the at least one data packet to the communications scheduler module for transmission over the network, wherein the communications scheduler is configured to:
determine the capacity of a network path, select a suitable network path, select a prioritized data flow for the selected network path, and direct the TCP/IP stack module to generate the at least one data packet for the selected prioritized data flow from the application data in the selected prioritized data flow for immediate transmission of the selected prioritized data flow over the network, overriding standard TCP flow control; and
executing by a processor a communications interface module stored in memory to transmit the at least one data packet for selected prioritized data flow via the selected network path at an optimal transmission rate, regardless of TCP flow control status.

9. The method of claim 8, wherein determining the capacity of the network path by the communications scheduler module includes determining a bandwidth estimate for the network path.

10. The method of claim 8, wherein the at least one data packet for the data flow is transmitted by the communications interface module via the selected network path at a rate based on a bandwidth estimate for the capacity of the network path.

11. The method of claim 8, further comprising determining by the communications scheduler module whether a data flow has information to send prior to selecting the data flow for the network path.

12. The method of claim 8, further comprising determining respective priorities of data flows by the communications scheduler module, wherein the data flow is selected based on the priorities and the capacity of the network path.

13. The method of claim 8, wherein the prioritized data flow is selected based on a fairness policy.

14. The method of claim 8, wherein the prioritized data flow is selected based on at least one of the application that originated the data flow, the user of the application, the number of data flows previously sent from the application or the user, and the number of packets previously sent from that data flow.

15. A non-transitory computer readable storage medium having a program embodied thereon, the program executable by a processor to perform a method for providing network communications, the method comprising:
executing a TCP/IP stack module stored in memory to:
receive a plurality of original application data packets from a data flow, inform a communications scheduler module that the data flow has data to be transmitted over a network, and generate at least one data packet for the data flow from the plurality of original application data packets to be transmitted over the network when directed by the communications scheduler module;
executing the communications scheduler module stored in memory to:
determine the capacity of a network path, select a suitable network path, select a prioritized data flow for the selected network path, and direct the TCP/IP stack module to generate the at least one data packet for the selected prioritized data flow from the application data in the selected prioritized data flow for immediate transmission of the selected prioritized data flow over the network, overriding standard TCP flow control; and
executing a communications interface module stored in memory to transmit the at least one data packet for selected prioritized data flow via the selected network path at an optimal transmission rate, regardless of TCP flow control status.

16. The computer readable storage medium of claim 15, wherein executing the communications scheduler module to determine the capacity of the network path includes determining a bandwidth estimate.

17. The computer readable storage medium of claim 15, wherein executing the communications interface module transmits the at least one data packet for the data flow via the selected network path at a rate based on a bandwidth estimate for the capacity of the network path.

18. The computer readable storage medium of claim 15, wherein the method further comprises executing the communications scheduler module to determine whether a data flow has information to send prior to the selection of the data flow for the network path.

19. The computer readable storage medium of claim 15, wherein the method further comprises executing the communications scheduler module to determine respective priorities of data flows, wherein the data flow is selected based on the priorities and the capacity of the network path.

20. The computer readable storage medium of claim 15, wherein the prioritized data flow is selected based on a fairness policy.

* * * * *